United States Patent
Björk et al.

(10) Patent No.: US 9,098,860 B2
(45) Date of Patent: Aug. 4, 2015

(54) RATING AND NOVELTY DECAY

(75) Inventors: Jonas Björk, Stockholm (SE); Mattias Lidström, Stockholm (SE); Simon Moritz, Solna (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 342 days.

(21) Appl. No.: 13/381,043

(22) PCT Filed: Jul. 9, 2009

(86) PCT No.: PCT/SE2009/050888
§ 371 (c)(1),
(2), (4) Date: Dec. 27, 2011

(87) PCT Pub. No.: WO2011/005157
PCT Pub. Date: Jan. 13, 2011

(65) Prior Publication Data
US 2012/0102047 A1    Apr. 26, 2012

(51) Int. Cl.
*G06F 17/30* (2006.01)
*G06Q 30/02* (2012.01)

(52) U.S. Cl.
CPC .......... *G06Q 30/02* (2013.01); *G06Q 30/0241* (2013.01); *G06Q 30/0278* (2013.01)

(58) Field of Classification Search
CPC .................... G06F 17/30699; G06F 17/30864
USPC ........ 707/800, 3, 5, 100, 748, 749, 736, 770, 707/662; 706/31, 46
See application file for complete search history.

(56) References Cited

U.S. PATENT DOCUMENTS

| | | | |
|---|---|---|---|
| 6,681,247 B1* | 1/2004 | Payton | 709/217 |
| 7,756,879 B2* | 7/2010 | Parsons et al. | 707/748 |
| 7,827,052 B2* | 11/2010 | Scott et al. | 705/7.11 |
| 7,949,581 B2* | 5/2011 | Barney | 705/35 |
| 8,429,175 B2* | 4/2013 | Lindstrom et al. | 707/749 |
| 8,443,007 B1* | 5/2013 | Kindig et al. | 707/800 |
| 8,495,238 B1* | 7/2013 | Banerjee et al. | 709/233 |
| 2006/0020614 A1* | 1/2006 | Kolawa et al. | 707/100 |
| 2006/0041548 A1* | 2/2006 | Parsons et al. | 707/5 |

(Continued)

FOREIGN PATENT DOCUMENTS

| | | |
|---|---|---|
| EP | 2040215 A3 | 2/2010 |
| JP | 2003-167901 A | 6/2003 |

OTHER PUBLICATIONS

Ranking a Stream of News. G. del Corso, A.Gulli, F.Romani.May 10-14, 2005. Japan.*

(Continued)

*Primary Examiner* — Mariela Reyes
*Assistant Examiner* — Thong Vu
(74) *Attorney, Agent, or Firm* — Myers Bigel Sibley & Sajovec, PA

(57) ABSTRACT

Application servers and methods of operating the same are provided for generating a personalized recommendation of items to a first user. An updated rating value $N(t)$ of an initial rating value $N(0)$ is determined for each rated item based on an age of each rating. The updated rating value $N(t)$ is based on a difference between the value of the initial rating $N(0)$ and a neutral rating value $R$, and on a predetermined half-life of the ratings. The updated rating value $N(t)$ converges towards the neutral rating value $R$ with an increase in the age $t$ for each rating.

10 Claims, 6 Drawing Sheets

(56) References Cited

U.S. PATENT DOCUMENTS

2007/0038607 A1* 2/2007 Herman et al. .................. 707/3
2008/0005098 A1* 1/2008 Holt et al. ........................ 707/5

OTHER PUBLICATIONS

Physics (2nd Edition) Paul A. Tipler 1983. Chapter37. pp. 1002-1004.*
PCT Written Opinion of the International Searching Authority, mailed Apr. 7, 2010 for PCT International Application No. PCT/SE2009/050888, filed Jul. 9, 2009 (7 pages).
PCT International Search Report, mailed Apr. 7, 2010 for PCT International Application No. PCT/SE2009/050888, filed Jul. 9, 2009 (4 pages).
PCT Written Opinion of the International Searching Authority, mailed Jun. 17, 2011 for PCT International Application No. PCT/SE2009/050888, filed Jul. 9, 2009 (7 pages).
PCT International Preliminary Report on Patentability, dated Oct. 14, 2011 for PCT International Application No. PCT/SE2009/050888, filed Jul. 9, 2009 (9 pages).
Japanese Office Action Corresponding to Japanese Patent Application No. 2012-519499; Date Issued: Jun. 18, 2013; English Translation, 2 Pages.

* cited by examiner

RATING AND NOVELTY DECAY

CROSS REFERENCE TO RELATED APPLICATIONS

This application is a 35 U.S.C. §371 national stage application of PCT International Application No. PCT/SE2009/050888, filed on 9 Jul. 2009, the disclosure and content of which is incorporated by reference herein in its entirety. The above-referenced PCT International Application was published in the English language as International Publication No. WO 2011/005157 A1 on 13 Jan. 2011.

TECHNICAL FIELD

The present invention relates to a method for a recommender system of generating a personalized recommendation of items, as well as to a Recommender system, and an Application Server comprising such a Recommender system.

BACKGROUND

A personalized recommender system presents information of items, e.g. movies, books, music, news, pictures, that are likely to be of interest to a user, i.e. the system recommends suitable items to the user after logon. A conventional recommender system may use content-based information filtering, involving a mapping of item content on a user profile, or collaborative information filtering, involving a prediction of a user's rating of an item, using a database of user ratings. More specifically, a user-based collaborative information filtering recommender system comprises finding other users that have a similar rating pattern as the first user, and predicting the first user's rating of not-consumed items, based on said other users rating of said items.

A user rating can be expressed explicitly by a user on a numerical scale, or by a ranking of items, or expressed implicitly, e.g. by a purchase, or by the time spent viewing an item.

In a conventional user-based collaborative filtering recommender system, the ratings from a first user are matched against the ratings from other users, in order to find other users that have similar rating pattern as the first user. Thereafter, the items that said other users have given high ratings, and that are not yet consumed by the first user, will be recommended to the first user.

The similarity of the rating patterns are typically determined by comparing the rating correlation of the co-rated items, the correlation calculated e.g. as the Pearson correlation or the adjusted cosine correlation.

Conventionally, a user rating of an item in a recommender system is static, i.e. the item will keep its initial rating, and will remain recommendable independently of the age of the rating and of the age of the item itself. This may be appropriate e.g. in systems recommending movies and books. However, in a system recommending news, the news items are normally only valid for a very short period of time, which is commonly referred to as "item churn". Thus, the age of a news item should preferably influence the validity of its user rating.

Das et. al: "Google News Personalization: Scalable Online Collaborative Filtering", WWW 2007/Track: Industrial Practice and Experience, May 8-12, 2007 describes handling of item churn behaviour by an updating and retrieval of the "click" recording and statistics in real time. According to the handling of item churn described in this article, every click made by a user influences the rating of the different news stories, and may change the set of recommended news story items. Thereby, the high item churn associated with news stories can be handled, enabling a recommendation of relevant news stories to users shortly after they appear in various source, during a suitable "expiry window". However, the article does not address how to calculate this "expiry window".

Ding and Li: "Time weight collaborative filtering", 14$^{th}$ ACM international conference on information and knowledge management, pages 485-492, ACM Press, New York, 2005, describes a time function, which is used to weight down the similarity between two items, if the ratings from the active user are old. However, this time function is only applicable on item-based collaborative filtering, since it can only weight down item similarities, and not user similarities, i.e. the similarity of the rating pattern of co-rated items from two different users. Another drawback occurs if two items have new ratings from most user's, but the ratings from the active user are comparatively older, in which case the similarity between the two items will be weighted down due to the old ratings from the active use, regardless of the ratings from the other users.

Gordea and Zanker: "Time filtering for Better Recommendation with Small and Sparse Rating Matrics", LNCS 4831, pages 171-183, 2007, describes a time decay filter and a time window filter, enabling a recommendation of new items, or items with a periodic interest, e.g. to recommend ice-skating only during the winter season. This solution weights down a final rating score based on the age of the actual item, not based on the age of the ratings of the item. Thus, if an item itself is old, it will be weighted down, even if the item has high ratings, and the ratings are recently added.

Thus, the above-described conventional recommender systems have several drawbacks, and it still presents a problem to achieve an improved recommender system, in which the age of the ratings is allowed to influence the recommendation of items, and which is applicable to e.g. a user-based collaborative filtering recommender system.

SUMMARY

The object of the present invention is to address the problem outlined above, and this object and others are achieved by the method and the arrangement according to the appended independent claims, and by the embodiments according to the dependent claims.

According to one aspect, the invention provides a method for a recommender system of generating a personalized recommendation of items to a first user. The method comprises updating a value of an initial rating, N(0), for each rated item, based on an age, t, of each rating, by determining a neutral rating value, R and calculating a value of an updated rating, N(t), for each rated item, based on a difference between the value of the initial rating, N(0), and the neutral rating value, R, and on a predetermined half-life of the ratings, t½[rating]. The value of the updated rating, N(t), converges towards the neutral rating value, R, with an increase in the age, t, of each rating.

The method may provide the following additional steps, using the updated rating value, N(t):

- receiving an initiation of a recommendation for the first user;
- finding the one or more additional users having the most similar rating pattern as the first user, based on the rating correlation between their co-rated items;
- predicting the first user's rating of one or more not-consumed items, which are rated by at least one of said one or more additional users. The prediction is based on the ratings of the additional users, and on the rating correlation between each of said additional user and the first user, and generating a recommendation of not-consumed items for the first user based on the predicted ratings.

Further, the prediction of the first user's ratings of not-consumed items may be weighted with a novelty weighting factor based on the age of each of said items, said novelty weighting factor converging towards zero with an increase in the age of each item, and on a pre-determined half-life for each item, t½[item].

According to a second aspect, the invention provides a Recommender system for generating a personalized recommendation of items to a first user. The Recommender system comprises a Rating updating unit arranged to calculate an update of the value of the initial rating, N(0), for each rated item, based on an age, t, of each rating. Said Rating updating comprises a Neutral rating unit for determining a Neutral rating value, R, and an Updated rating value unit for calculating an updated rating, N(t), for each rated item, based on the difference between the initial rating, N(0), and the neutral rating value, R, and on a predetermined half-life, t½[rating], of the ratings. The value of the updated rating converges towards the neutral rating value with an increase in the age, t, of each rating.

The Recommender system may further comprise an Initiating unit for initiating a recommendation for the first user; a Correlation unit for finding the one or more additional users having the most similar rating pattern as the first user, based on the rating correlation between their co-rated items, using updated ratings, N(t), a Prediction unit for predicting the first user's rating of one or more not-consumed items, which are rated by at least one of said one or more additional users, the prediction based on the ratings of the additional users and on the rating correlation between each additional user and the first user, using updated ratings, N(t), and a Recommending unit for generating a recommendation of not-consumed items to the first user based on the predicted ratings.

Said Prediction unit may be further arranged to weight the prediction of the first user's ratings of not-consumed items with a novelty weighting factor based on the age of each of said items, the novelty weighting factor converging towards zero with an increased age of each item, and on a pre-determined half-life for each item, t½[item].

According to a third aspect, the invention provides an Application Server comprising a Recommender system, according the second aspect.

Additionally, the value of the initial rating N(0) may be calculated as a function of one or more input parameters, and the neutral rating value, R, may correspond to the average rating for the rated items associated with each user, or to the average of the different user ratings associated with each rated item.

Further, the converging value of the updated rating, N(t), may depend on the value of $e^{-(ln\ 2/t1/2[rating])\times t}$, the value of the half-life for each item, t½[item], may depend on the item type, and the novelty weighting factor may depend on the value of $e^{-(ln\ 2/t1/2[item])\times t}$.

An advantage with the present invention is that a fresh recommendation of items can be provided to a user. This is achieved by taking the age of the ratings into account, and updating the values of the "old" ratings. Additionally, the recommendation could also take the age of the items into account, by weighting down the predicted ratings depending on the age of the item. Thus, even if certain items received very high ratings in the past, an older rating will have a lower influence on a current recommendation than a recent rating.

BRIEF DESCRIPTION OF THE DRAWINGS

The present invention will now be described in more detail, and with reference to the accompanying drawings, in which.

DETAILED DESCRIPTION

Figure 1:
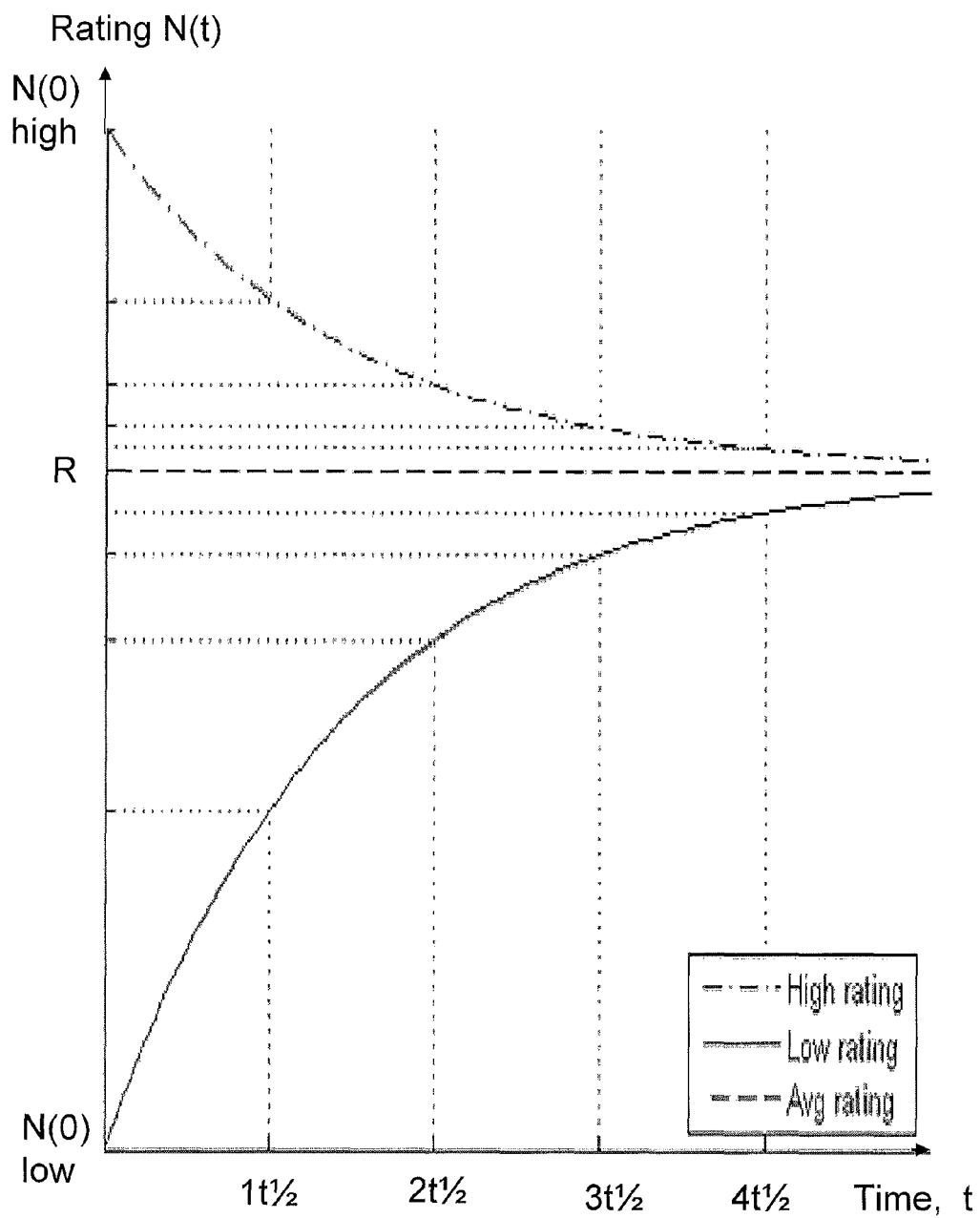
FIG. 1 illustrates how an updated rating value, N(t), converges from the initial rating value, N(0), towards a neutral rating value, R, depending on the age of the rating, according to an exemplary embodiment of this invention.

In the following description, the invention will be described in more detail with reference to certain embodiments and to accompanying drawings. For purposes of explanation and not limitation, specific details are set forth, such as particular scenarios, techniques, etc., in order to provide a thorough understanding of the present invention. However, it is apparent to one skilled in the art that the present invention may be practised in other embodiments that depart from these specific details.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as in a system comprising a computer processor and a memory coupled to the processor, wherein the memory is encoded with one or more programs that may perform the functions disclosed herein.

A basic concept of this invention is to determine an update of an initial rating in a recommender system, the updated rating converging towards a neutral rating value depending on a pre-determined half-life of the rating, e.g. by modelling the value of a rating as a radioactive decay. A rating could be expressed explicitly by a user on a numerical scale, or by a ranking of items, or expressed implicitly, e.g. by a purchase, or by the time spent viewing an item. Further, since many items become less interesting as they age, the age of the item could also be taken into consideration in the model.

More specifically, a personalized recommendation of items is generated for a first user, by updating the initial rating, N(0), for each rated item, based on an age, t, of each rating. The updating comprises determining a neutral rating value, R, and calculating a value of an updated rating, N(t), for each rated item. The calculated value depends on a difference between the value of the initial rating, N(0), and the neutral rating value, R, and further on a predetermined half-life of the ratings, t½[rating]. The calculated value converges towards the neutral rating value, R, with an increase in the age, t, of each rating, e.g. as a radioactive decay, depending on the value of $e^{-(\ln 2/t1/2[rating]) \times t}$, t corresponding to the age of the rating.

A radioactive decay is conventionally described by the following function:

$$N(t) = N(0) \times e^{-\lambda \times t} \quad \text{[Equation 1]}$$

In a radioactive decay, N(0) represents the original amount of radioactive substance when t=0, and the decayed value of N(t) converges towards zero with a rate that depends on the decay constant, λ. However, according to this invention, N(0) will represent the initial rating value when t=0. According to a further embodiment, this initial rating, N(0), is calculated a function of different factors that could affect a recommendation, such as e.g. initial expectations and commercial factors. As mentioned above, λ represents a decay constant in Equation 1, but a more commonly used parameter to describe the rate of decay is the half-life, t½, which is related to the decay constant as follows:

$$\lambda = \ln 2/t½ \quad \text{[Equation 2]}$$

A combination of Equation 1 and Equation 2 gives:

$$N(t) = N(0) \times e^{-(\ln 2/t1/2) \times t} \quad \text{[Equation 3]}$$

According to this invention, the value of the actual rating decays with a pre-determined half-life of the rating, t½[rating], in order to reflect the change of a user's preferences over time. Thus, the half-life, t½, determines the time interval after which the distance between the actual rating value and a neutral rating value is halved. E.g. if a user gave a movie a top rating five years ago, this old rating should be updated in order to reflect a change in the preferences of the user.

According to an embodiment of this invention, the initial rating values are updated according to the following equation:

$$N(t) = (N(0) - R) \times e^{-(\ln 2/t1/2) \times t} + R \quad \text{[Equation 4]}$$

N(t) is the actual updated rating value, and R is a neutral rating value, towards which the updated rating will "decay", i.e. converge.

FIG. 1 illustrates how the actual rating value N(t) converges towards the neutral rating value R, according to this invention, regardless of whether the initial rating value N(0) is larger than the neutral rating value R, such as N(0) high, or smaller than R, such as N(0) small. In this figure, R is an average rating value.

Figure 3:
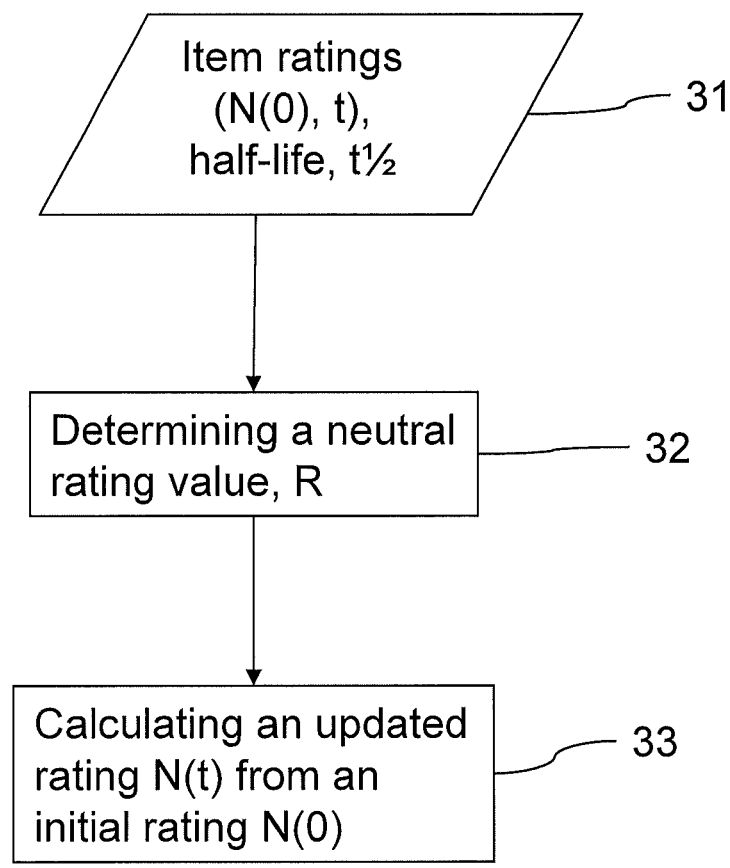
FIG. 3 is a flow diagram illustrating the updating of an initial rating value from a user, according to an exemplary embodiment of this invention.

FIG. 3 is a flow diagram illustrating an updating of an initial rating value, according to a first embodiment of this invention. In 31, the initial rating value, N(0), the age, t, of this initial rating, and the half-life of the rating, t½[rating) are given, typically fetched from a database, or e.g. as an input in the recommender system upon initiation of a recommendation. In step 32, a neutral rating value, R, is determined, the neutral rating value e.g. corresponding to an average of the rated items associated with each user, or to an average of the different user rating associated with each item. Alternatively, the neutral rating value R could be any suitable fixed value, depending e.g. on the item type. In step 33, an updated rating value, N(t), is calculated, based on t½[rating) and on a difference between N(0) and R, such that N(t) converges towards R with an increased age, t, of the rating.

Figure 4:
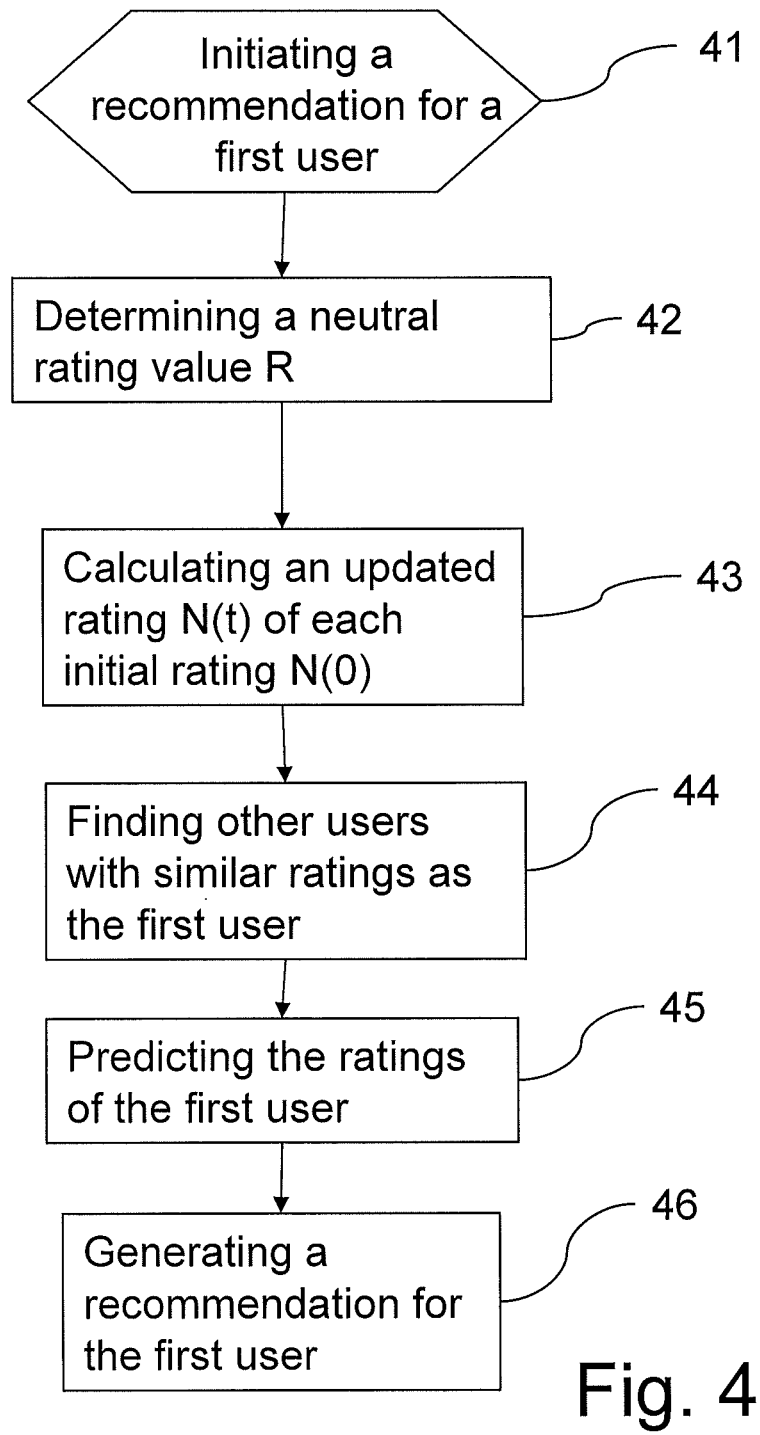
FIG. 4 is a flow diagram illustrating a personalized recommendation of items to a user, by means of collaborative filtering, according to an exemplary embodiment of this invention.

FIG. 4 is a flow diagram illustrating a method of generating a personalized recommendation for a user, according to a further embodiment of this invention, including the steps of updating the initial rating values, shown in FIG. 3. In step 41, a recommendation is initiated, e.g. by a user performing a login to a website, such as e.g. the Amazon. In order to recommend suitable non-consumed items to a first user, the other users with the most similar rating patterns are found, in step 44. This is accomplished e.g. by finding other users that have rated items in common with the first user, calculating the correlation between the co-rated items, using e.g. the Pearson correlation, and detecting the users having the highest rating correlation with the first user. However, in agreement with the basic concept of this invention, updated rating values are calculated for all the ratings, in step 43, using a neutral rating value determined in step 42 before calculating the correlation in step 44. When e.g. the Pearson correlation is calculated, in step 44, then an average rating is determined for each user. In step 45, the first user's rating of non-consumed items is predicted, based on the rating of these items from the detected other users having the most similar rating pattern, and on the rating correlation of co-rated items between the active user and each of the other users. Finally, in step 46, a recommendation is generated to the first user, the recommendation comprising the items having the highest predicted ratings.

An exemplary calculation of the correlation between ten co-rated items of the User u and the User v is illustrated below by two similar vectors, R(u) and R(v), corresponding to the initial rating, N(0), of the ten co-rated items for User u and User v, respectively:

R(u): [5 4 5 2 2 1 4 5 3 1]
R(v): [5 4 5 2 2 1 4 5 3 1]

The average of all the ratings from User u is 3.5, and the average of all the ratings from User v is 3.1, since only the co-rated items have the same ratings. Accordingly, the Pearson correlation between the co-rated items is 1, since User u and User v have exactly the same ratings of the co-rated items, and the User u and the User v are considered to have similar rating patterns. Further, all the items have a half-life t½ of 2, and the age, T, of each rating value is indicated by the following vectors:

T(u)=[2.0 2.2 1.8 2.1 1.4 0.1 0.2 0.1 0.3 0.1]
T(v)=[0.1 0.2 0.1 0.3 0.1 0.1 0.1 0.1 0.2 0.2]

Accordingly, by applying Equation 4 on these values, i.e. $N(t) = (N(0) - R) \times e^{-(\ln 2/t1/2) \times t} + R$, and by using the above rating averages as neutral rating value, R, the updated rating values, N(t), for User u and User v will correspond to the following vectors:

R(u): [4.10 3.57 4.16 2.62 2.46 1.07 3.95 4.94 3.02 1.07]
R(v): [4.94 3.95 4.94 2.12 2.04 1.07 3.97 4.94 3.01 1.15]

Thus, the updated rating values N(t) for User u and User v converge towards the rating averages 3.5 and 3.1, respectively. The conventional Pearson correlation between the updated rating values, N(t), from User u and User v for these ten co-rated items corresponds to 0.8156, which is lower than the correlation between the initial rating values, N(0), even though the ratings of the co-rated items are exactly the same. This difference is due to the fact that User u rated the first five items relatively long time ago, which is indicated by the age, T, of the first five ratings from User u being comparatively large. Therefore, the updated rating values of these five older ratings have decayed towards the average rating R of User u, and will, consequently, have less influence when the correlation is calculated.

According to a further embodiment of this invention, a recommendation of items to user will also take into account the age of the items, since each item has a certain novelty that decreases with time. The half-life of each item, t½[item], determines the time interval after which the novelty of the item is halved. This half-life depends e.g. on the content type of a particular item, such that a movie may have a half-life, t½, corresponding to two years, and a news episode on broadcasted TV may have a half-life, t½, corresponding to only one day. Thus, according to an exemplary embodiment of this invention, the predicted ratings of a user is further weighted down by a novelty weighting factor indicating the novelty decay of the item, the novelty weighting factor converging towards zero depending on the pre-determined half-life of the item and on the age of the item. According to a further exemplary embodiment, Equation 4 is used to determine the novelty weighting factor, with N(0)=1 and R=0, which means that the novelty weighting factor depends on the following function:

$$\text{Novelty weighting factor }(t)=e^{-(\ln 2/t1/2[item])\times t} \quad [\text{Equation 5}]$$

Thus, only one parameter, i.e. the half-life of the item, t½[item], determines the Novelty weighting factor.

Figure 2:
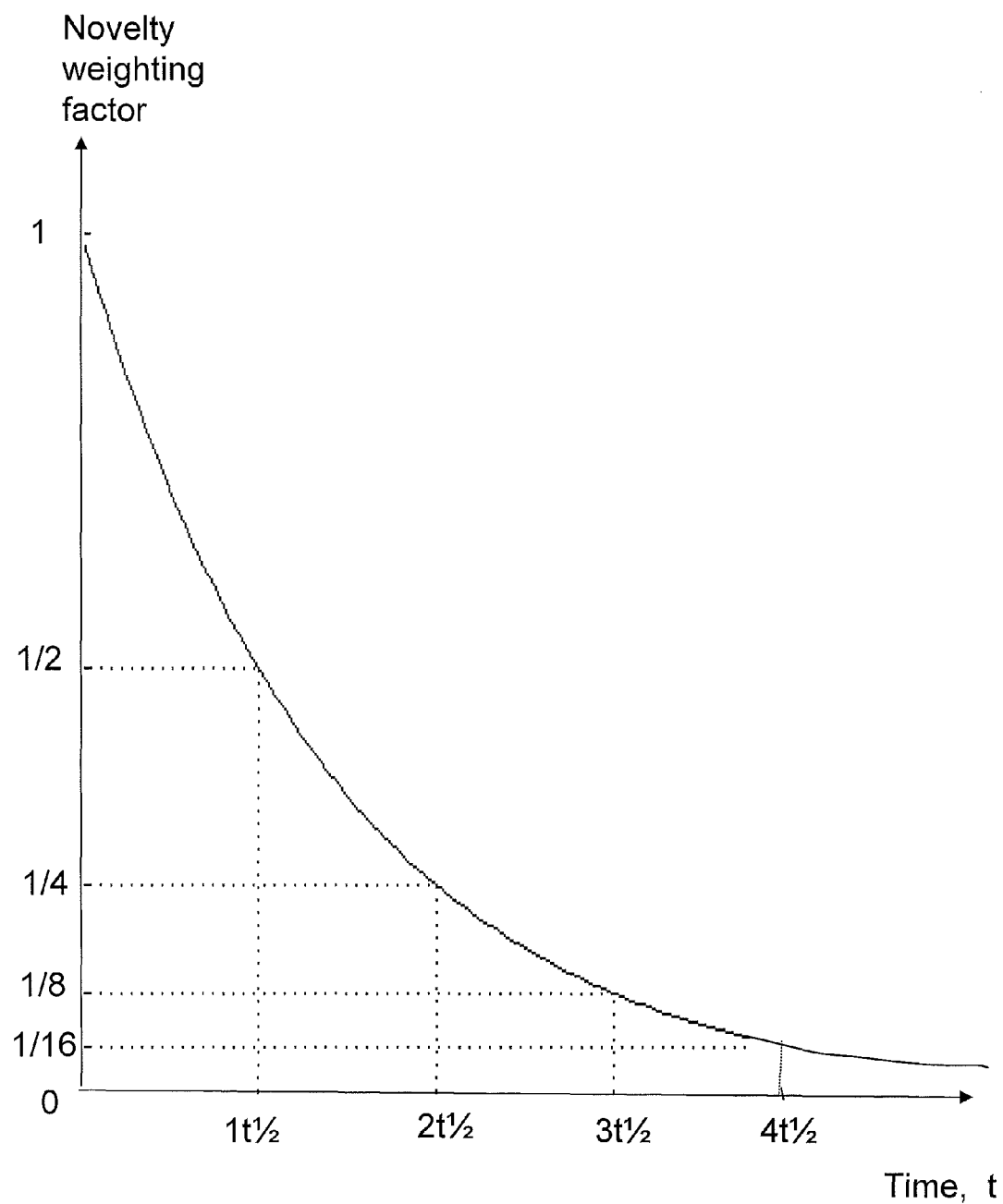
FIG. 2 illustrates how the weight of a recommended item is converging towards zero, depending on the age of the item, according to a further exemplary embodiment of this invention.

FIG. 2 is a graph illustrating the Novelty weighting factor indicated by Equation 5, i.e. how the Novelty weighting factor of the rating of an item decreases with an increase in the age of the item.

A recommender system typically provides a recommendation of suitable items to a user, and the aim of the recommender system is to predict the preferences of the user. By applying a Novelty weighting factor, e.g. according to Equation 5, on the predicted user ratings of not-consumed item, the predicted user rating will be decreased depending on the age of the item.

In order to illustrate the use of the Novelty weighting factor indicating the novelty decay, we assume that a recommender system has predicted a rating from User u for all the items that User v has rated, but User u has not yet consumed. These predicted ratings are ranked with the highest predicted rating on top, as illustrated in the listing below, in which the half-life of the item, t½=2, and the Novelty weighting factor (NWF) is computed using Equation 5 above:

| Item | Predicted rating | Age | NWF | New prediction |
|------|------------------|-----|-----|----------------|
| item 77 | 4.89 | 0.2 | 0.9330 | 4.5625 |
| item 19 | 4.75 | 0.8 | 0.7579 | 3.5998 |
| item 4 | 4.68 | 4.2 | 0.2333 | 1.0916 |
| item 99 | 4.52 | 0.4 | 0.8706 | 3.9349 |
| item 10 | 4.12 | 0.1 | 0.9659 | 3.9797 |

From the listing of items above, it appears that since item 4 is comparatively old, it will be weighted down more. Thus, the ranking of the items of the final recommendation provided for User u is re-arranged in agreements with the new predicted rating, which are highlighted in the last column in the listing below, in which the Novelty weighting factor (NWF) has been taken into account:

| Item | Predicted rating | Age | NWF | New prediction |
|------|------------------|-----|-----|----------------|
| item 77 | 4.89 | 0.2 | 0.9330 | 4.5625 |
| item 10 | 4.12 | 0.1 | 0.9659 | 3.9797 |
| item 99 | 4.52 | 0.4 | 0.8706 | 3.9349 |
| item 19 | 4.75 | 0.8 | 0.7579 | 3.5998 |
| item 4 | 4.68 | 4.2 | 0.2333 | 1.0916 |

According to a further embodiment of this invention, the initial rating value, N(0) is not an implicit or explicit rating from a user, stored in a database, but instead a function of different parameters, representing e.g. initial expectations and commercial considerations. Thus, if two input parameters are used as in Equation 4 with N(0) as a function of the parameters, a more complex behaviour could be modelled.

Figure 5:
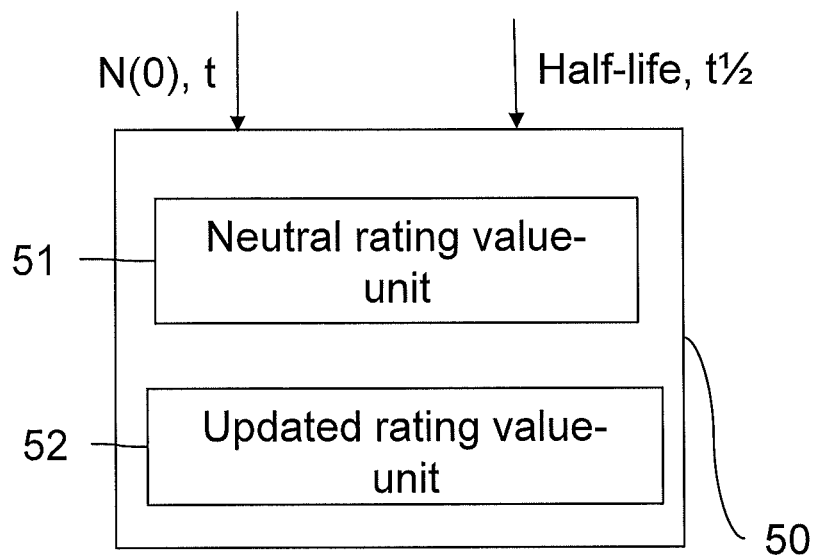
FIG. 5 schematically illustrates a Rating updating unit, according to an exemplary embodiment of this invention.

FIG. 5 illustrates an exemplary Rating updating unit 50, according to this invention, configured to calculate an update of the value of the initial rating, N(0), for each rated item, based on the age, t, of each rating. The Rating updating unit comprises a Neutral rating value-unit 51 configured to determine a neutral rating value, R, towards which an updated value, N(t) will converge. The neutral rating value R is determined e.g. as an average of all the ratings from the user, or as an average of all the ratings for an item from different users, or alternatively as a fixed value. The Rating updating unit 50 further comprises an Updated rating value-unit 52 configured to calculate an updated rating value, N(t), based on the difference between the initial rating, N(0), and the neutral rating value, R, and on a predetermined half-life, t½[ratings] of the ratings. The value of the updated rating, N(t), converges towards the neutral rating value, R, with an increase in the age, t, of each rating, and the value of the updated rating, N(t), can be calculated e.g. by using Equation 4:

$$N(t)=(N(0)-R)\times e^{-(\ln 2/t1/2)\times t}+R$$

In Equation 4 above, it is inserted an initial rating value N(0), the age, t, of said initial rating and the half-life of the rating, t½[rating]. These parameters are received by the Rating updating unit upon initiation of a recommendation, e.g. fetched from a database.

Figure 6:
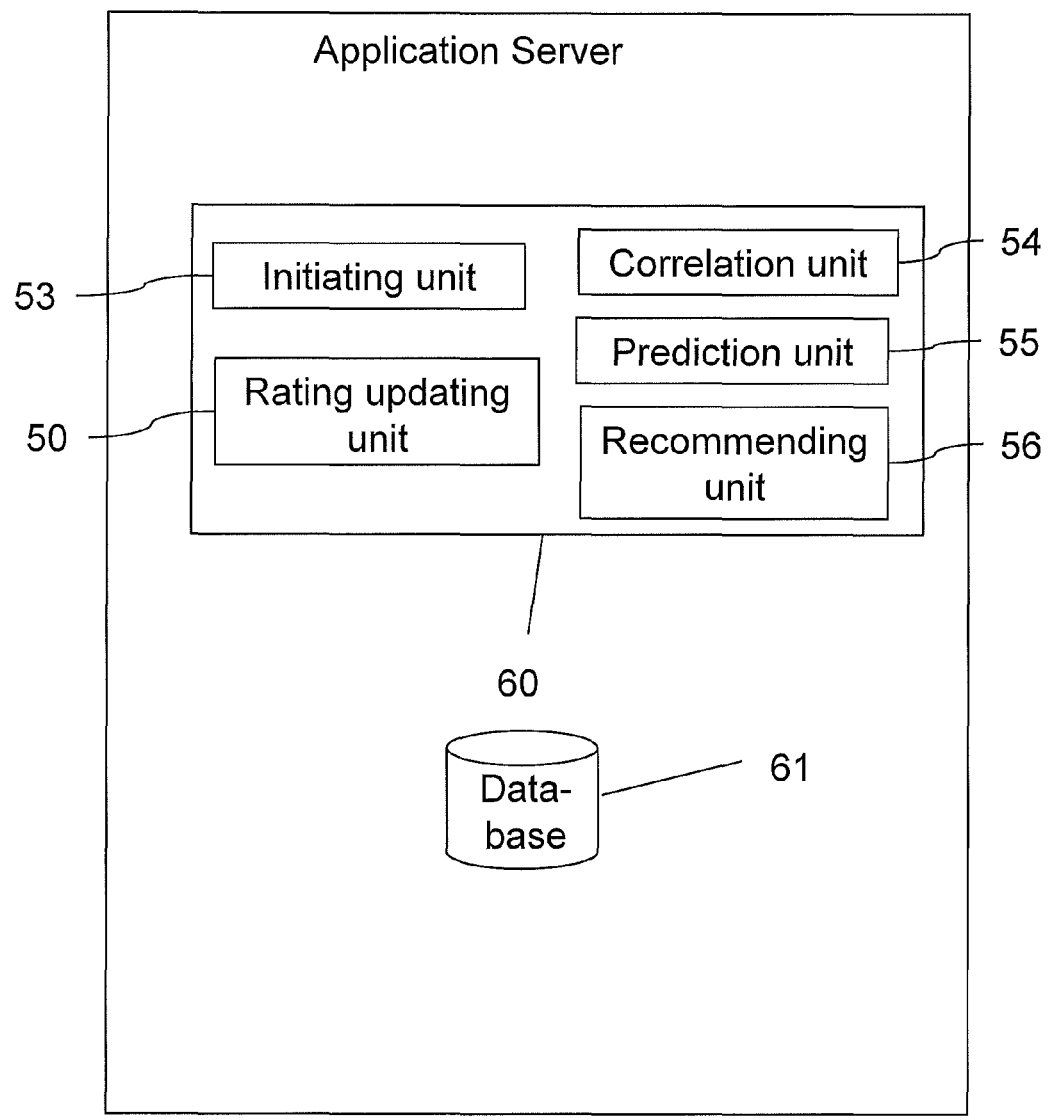
FIG. 6 schematically illustrates an Application server comprising a Recommender system, according to an exemplary embodiment or this invention, provided with a Rating updating unit, as illustrated in FIG. 5, and a database.

FIG. 6 illustrates an exemplary Application Server comprising a Recommender system 60, according to this invention, the Recommender system provided with a Rating updating unit 50, as described in connection with FIG. 5. The Application Server according to this exemplary embodiment is also provided with a Database 61 for storing parameters required by the Rating updating unit. The Recommender system further comprises an Initiating unit 53 configured to initiate a recommendation for a user, normally after a user logon. The Initiating unit is also arranged to fetch and forward said required parameters from the Database 61, such as e.g. the half-life, t½, the initial ratings, N(0), and the age, t, of the ratings to the appropriated units. The Recommender system further comprises a Correlation unit 54 configured to find the one or more additional users having the most similar rating pattern as the user for which the recommendation is intended, based on the rating correlation between their co-rated items. The rating correlation is calculated as any suitable conventional correlation, e.g. the Pearson correlation or the adjusted cosine correlation. The Correlation unit uses updated rating values, N(t,) received from the Rating updating unit 50. Additionally, the Recommender system comprises a Prediction unit 55 configured to predict the rating of one or more not-consumed items of the first user, the items rated by at least one of said one or more additional users. The prediction is based on said additional user's ratings of said items, and on the calculated rating correlation between the additional user and the user for which the recommendation is intended, the prediction using updated ratings, N(t), received from the Rating updating unit 50. Finally, the Recommender system comprises a Recommending unit 56 configured to generate a recommendation of not-consumed items to the user, based on the predicted ratings of items that are not consumed by the user.

According to a further embodiment, the Recommender system is arranged to weight the predicted ratings of the recommended non-consumed items with a Novelty weighting factor, indicating a novelty decay based on the age of each of said items. The Novelty weighting factor converges towards zero depending on the age of each item, and on a pre-determined half-life for each item, t½[item], the value of the half-life of each item, t½[item] depending e.g. on the item type.

According to an exemplary embodiment, the novelty weighting factor is calculated from Equation 5 above, e.g. as $e^{-(ln2/t1/2[item]) \times t}$, in which t corresponds to the age of the item.

It should be noted that the Rating updating unit and the Recommender system of the Application Server, as illustrated in FIGS. 5 and 6, may be implemented by physical or logical entities using software functioning in conjunction with a programmed microprocessor or general purpose computer, and/or using an application specific integrated circuit (ASIC).

An advantage with the invention is that it provides a fresh recommendation of items to a user, taking the age of the ratings into account, by updating the values of the "old" ratings. Further, the recommendation could also take the age of the items into account, by weighting down the predicted ratings depending on the age of the item. Thereby, even if certain items received very high ratings in the past, any comparatively old rating will have a lower influence on a current recommendation.

Further, the above mentioned and described embodiments are only given as examples and should not be limiting to the present invention. Other solutions, uses, objectives, and functions within the scope of the invention as claimed in the accompanying patent claims should be apparent for the person skilled in the art.

The invention claimed is:

1. An application server in a recommender system, comprising:
   a processor; and
   a memory coupled to the processor that comprises a computer program that when executed by the processor causes the processor to perform operations comprising:
   calculating an initial rating value N(0) for each of a plurality of items rated by a user;
   determining a neutral rating value R for each of the plurality of items rated by the user; and
   calculating a value of an updated rating N(t) for each of the rated items, based on a difference between the initial rating value N(0) and the neutral rating value R and on a predetermined half-life (t½[rating]) of each one of the ratings, the updated rating value N(t) converging towards the neutral rating value R with an increase in the age t of each one of the ratings;
   wherein a converging value of the updated rating N(t) depends on a value of $e^{-(ln2/t1/2[rating]) \times t}$.

2. An application server according to claim 1, wherein calculating the initial rating value N(0) comprises calculating the initial rating value N(0) as a function of at least one input parameter.

3. An application server according to claim 1, wherein the neutral rating value R corresponds to an average rating for the rated items associated with each user.

4. An application server according to claim 1, wherein the neutral rating value R corresponds to an average of different user ratings associated with each of the rated items.

5. An application server according to claim 1, wherein a value of a half-life for each of the items t½[item] depends on an item type.

6. An application server, comprising:
   a recommender system provided with a rating updating unit configured to calculate an initial rating value N(0) for each of a plurality of items rated by a user and to calculate an update of an initial rating value (N(0)) for each of a plurality of user rated items based on an age (t) of each one of the ratings, the rating updating unit comprising:
   a neutral rating unit configured to determine a neutral rating value (R) for each of the plurality of user rated items; and
   an updated rating value unit configured to calculate an updated rating (N(t)) for each of the rated items, based on the difference between the initial rating value N(0) and the neutral rating value R and on a predetermined half-life (t½[rating]) of each one of the ratings, the updated rating value N(t) converging towards the neutral rating value with an increase in the age t of each one of the ratings;
   wherein a converging value of the updated rating N(t) depends on a value of $e^{-(ln2/t1/2[rating]) \times t}$.

7. An application server according to claim 6, wherein the rating updating unit is further configured to calculate the initial rating value N(0) as a function of at least one input parameter.

8. An application server according to claim 6, wherein the neutral rating value R corresponds to an average rating for the rated items associated with each user.

9. An application server according to claim 6, wherein the neutral rating value R corresponds to an average of different user ratings associated with each of the rated items.

10. An application server according to claim 6, further comprising a database for storing parameters used by the rating updating unit.

* * * * *

UNITED STATES PATENT AND TRADEMARK OFFICE
CERTIFICATE OF CORRECTION

PATENT NO. : 9,098,860 B2  Page 1 of 1
APPLICATION NO. : 13/381043
DATED : August 4, 2015
INVENTOR(S) : Björk et al.

It is certified that error appears in the above-identified patent and that said Letters Patent is hereby corrected as shown below:

In the Specification

In Column 6, Line 67, delete "news episode" and insert -- new episode --, therefor.

Signed and Sealed this
Twenty-sixth Day of April, 2016

Michelle K. Lee
*Director of the United States Patent and Trademark Office*